United States Patent [19]
Byrd et al.

[11] Patent Number: 6,123,172
[45] Date of Patent: Sep. 26, 2000

[54] THERMAL AND ACOUSTICAL INSULATING SHIELD

[75] Inventors: Timothy L. Byrd, Boonville; John J. Hiers, Elkin, both of N.C.

[73] Assignee: Lydall, Inc., Manchester, Conn.

[21] Appl. No.: 09/358,841

[22] Filed: Jul. 22, 1999

[51] Int. Cl.$^7$ ...................................................... E04B 1/82
[52] U.S. Cl. .......................... 181/290; 181/286; 428/220
[58] Field of Search .................................. 181/290, 293, 181/286, 287, 294, 295; 428/95–97, 201, 215, 218, 219, 220

[56] References Cited

U.S. PATENT DOCUMENTS

| | | |
|---|---|---|
| 3,975,565 | 8/1976 | Kendall . |
| 4,237,180 | 12/1980 | Jaskowski . |
| 4,522,876 | 6/1985 | Hiers . |
| 4,847,140 | 7/1989 | Jaskowski ............................... 428/220 |
| 4,851,274 | 7/1989 | D'Elia . |
| 4,996,095 | 2/1991 | Behdorf et al. . |
| 5,547,731 | 8/1996 | Tesch ........................................ 428/95 |

*Primary Examiner*—Khanh Dang
*Attorney, Agent, or Firm*—Birch, Stewart, Kolasch & Birch, LLP

[57] ABSTRACT

A flexible, adhesively attachable, self-sealing, thermal and acoustical insulating shield has a needled, flexible, fibrous batt having an insulating layer of insulating fibers disposed between opposite binding layers of binding fibers. Binding fibers of each binding layer are needledly disposed through the insulating layer and an opposite binding layer to provide tufts of binding fibers protruding from the opposite binding layer so a to form a tufted upper surface and a tufted lower surface of the batt. A flexible adhesive is disposed and adhered substantially over the upper surface and, preferably, over lower surface of the batt such that the tufts on the upper and lower surfaces are secured to the surfaces by the adhesive. A flexible, protective foil is adjacent to, and preferably permanently adhered by the adhesive to, the lower surface of the batt. The protective foil has edge portions which extend beyond edges of the fibrous batt and the edge portions have a flexible adhesive disposed and adhered substantially over upper edge surfaces of the edge portions. The shield may be flexed and pressed to configure and permanently attach the tufted upper surface to an object to be shielded and the edge portions may be pressed to permanently attach the edge upper surfaces of the edge portions to the object so as to self-seal the edge portions to the object.

44 Claims, 6 Drawing Sheets

THERMAL AND ACOUSTICAL INSULATING SHIELD

The present invention relates to an improved thermal and acoustical insulating shield and more particularly to such shield which is adhesively attached to an object to be protected. The present invention, more specifically, is an improvement of the invention disclosed in U.S. patent application Ser. No. 09/033,852, filed on Mar. 3, 1998, the disclosure of which is incorporated herein by reference.

BACKGROUND OF THE INVENTION

Thermal and acoustical insulating shields, to which the present invention is an improvement, have long been known in the art. Such shields are used in a wide variety of applications, among which are shielding in space crafts, automobiles, home appliances, electronic components, industrial engines, boiler plants and the like. Some of such shields have proportionally smaller thermal insulating value and proportionally higher acoustical insulating value, and vice versa. There are, of course, shields which lie therebetween.

In connection with the thermal insulating value, shields are known which provide thermal insulation, primarily, by virtue of being a radiation thermal shield, while others provide thermal insulation by being, primarily, a conduction thermal shield, and, again, there are shields that lie therebetween. For example, pressed and formed sheet metal has long since been mounted by bolts, nuts, screws, welding, etc. between an object to be protected, i.e. shielded, for example, the floor pan of an automobile, and a heat source, for example, a portion of the exhaust system of the automobile. Such a formed sheet metal provides thermal insulation, primarily, by re-radiation of heat from the portion of the exhaust system back into the ambient and/or other cooler parts of the undercarriage of an automobile to thermally insulate the floor pan from that portion of the exhaust. Such sheet metal shields, however, have low acoustical insulating value, and a large portion of noise produced in an adjacent portion of an exhaust system can be transmitted through the floor pan of the automobile and into the passenger compartment. Additional noise can be produced by loose shields which vibrate and/or rattle. Such sheet metal shields, also, provides thermal insulation value in connection with conductive heat, since such sheet metal shields will be spaced between the floor pan and the portion of the exhaust, and that spacing provides an air gap between the shield and the floor pan which reduces conductive, and to some extent, convective heat transfer.

Where substantial acoustical shielding is also required, metal shields, as described above, are not satisfactory. In such requirements, the shields generally are at least in part fibrous in nature, e.g. batts of fiberglass, which provide increased acoustical insulation as well as good conduction thermal insulation. However, such insulation can only be used where there are insignificant forces, both static and dynamic, on the fibrous insulation, since batts of fiberglass, for example, have very little strength in any direction, i.e. in either the X, Y or Z directions. Such shields are, however, very useful in certain applications, for example, thermal insulation in domestic dishwashers.

A very particular problem in regard to such shields has been encountered by the automobile industry and like industries, and that problem has become acute in recent years. As the overall size of automobiles continues to shrink, space within any portion of the assembled automobile is now at a premium. For example, in past designs of automobiles, sufficient room existed between the exhaust system of the automobile and the floor tunnel of the automobile that the usual sheet metal shield could be suspended in the tunnel, e.g. with bolts, screws, welding and the like, with specially provided ears or dogs or connectors, so as to space that sheet metal shield from the tunnel and from the exhaust system. This provided a radiation barrier to heat transfer from the exhaust system to the tunnel, as well as a conductive and convective heat transfer barrier in view of the spacing between the shield and the tunnel. This design also provided some acoustical insulation. However, with modern designs, the spacing between the exhaust system and the tunnel is now very much reduced, and in many situations, it is now no longer practical to suspend shields between the exhaust and tunnel, and, moreover, the reduced spacing correspondingly reduces any air gap remaining between the shield and the tunnel, such that very little conductive and convective heat insulation or acoustical insulation results.

The art has long recognized that fibrous batts, usually containing inorganic fibers, such as glass fibers, mineral and clay wool fibers, alumina-silicate fibers, silica fibers and the like provide very good thermal and acoustical insulation and could potentially be a replacement for the suspended sheet metal shields. The problem with such insulation is that the batts, especially of such inorganic fibers, are usually made by air laying fibers onto a moving belt, and, hence, the fibers tend to stratify in non-discrete layers throughout the thickness (Z direction) of the batts. Since these fibers are not substantially interlocked in the z direction, the batt has very low Z-directional tensile strength. Even under static loading of its own weight, for example, a batt of fiberglass will simply sag out of its original configuration when suspended from an upper surface thereof. The art has, therefore, expended substantial effort in attempting to provide greater tensile strength to such fibrous batts, in regard to both the X and Y directions and the Z direction.

An early attempt in this regard is disclosed in U.S. Pat. No. 3,975,565 to Kendall, which proposes a composite structure of layered inorganic fibers and organic fibers which are needled together to provide insulating batts (both thermal and acoustical) which have greater tensile strengths in all directions, especially in the Z direction. In this approach, an inorganic fiber layer, such as that of glass fibers, is sandwiched between two layers of organic fibers, for example, cellulose acetate fibers, and needling of the composite sandwiched layers is achieved from either one or both sides of the composite so as to drive portions of the organic fibers from the organic fiber layer(s) through the inorganic fiber layer (glass fibers) and, thus, to tack the composite together and, particularly, improve the Z-directional strength. However, because of the needling technique used in that process, the needle punch density could not be greater than about 260 needle punches per square inch, since, at above about 260 needle punches per square inch, glass fiber damage resulted and with a more than 25% loss of mat strength. While such an approach certainly improved Z-directional strength, with such low numbers of needle punches, the Z-directional strength of such a composite is still quite low and unacceptable for most modern thermal/acoustical insulating applications where substantial static and dynamic forces are placed on that insulation, e.g. in suspended use with an automobile, as discussed above.

In U.S. Pat. No. 4,237,180 to Jaskowski, it is proposed to improve such composite thermal and acoustical insulating batts by including in the inorganic fiber layers heat shrinkable organic fibers. After needling, the composite batt is subjected to temperatures sufficient to cause the organic fibers to shrink, e.g. at least 40% in length, whereby the shrinking fibers mechanically interlock the inorganic fibers into a more consolidated form and therefor improve the strength, particularly in the Z direction. However, shrinking fibers is not only a difficult process, but is substantially uncontrollable, and this approach does not result in uniform products. Moreover, the tensile strengths, and particularly the Z-directional tensile strengths, are not greatly improved by that process.

U.S. Pat. No. 4,522,876 to Hiers recognizes the problems noted above and specifically addresses the problem of a low number of needle punches described in the Kendall patent and the undesired results thereof. The Hiers patent takes a different approach in that it achieves high numbers of needle punches per square inch by the technique of ensuring that the barbs of needles passing through an organic fiber outer layer(s) are loaded with the organic fibers of that layer(s) before the barbs reach the adjacent glass fiber layer. Since the barbs are filled with organic fibers, the barbs cannot engage and break the glass fibers as the needles pass through the glass fiber layer, and the resulting batt can be highly needled with exceptional Z-directional strength, as well as greatly improved X- and Y-directional strengths. While this approach is a very decided advance in the art, it still encounters difficulties when such batts experience high static and dynamic loadings, such as in the case of an automobile with a suspended shield, as described above. These difficulties will be more clear hereinafter.

A somewhat different approach in the art is described in U.S. Pat. No. 4,851,274 to D'Elia. In that approach, onto a needlable substrate is placed a middle layer of mineral fibers of short lengths such as to preclude interlocking of other fibers of the structure. A top layer of organic fibers is placed thereon. Needling is then achieved through that top layer and middle layer to the substrate with needle punches up to about 3,000 per square inch. Since the inorganic fibers are not substantially interlocked, the web becomes quite flexible and a binder can be applied to that structure, such as a phenolic binder, and set for forming a moldable thermal and acoustical shield useful, for example, as trunk liners. However, the use of a synthetic resin to achieve formability of such a shield is a decided disadvantage, since it is quite expensive to use a binder, and, moreover, the shield must be molded with conventional tools and dies, which themselves are quite expensive.

U.S. Pat. No. 4,996,095 to Behdorf et al attempts to solve the problem by yet a further approach. In that patent, it is proposed that a glass fiber mat be bonded to a sheet of aluminum by an adhesive of a particular nature and that the adhesive-joined composite can be used as a shield between an automobile floorboard and an exhaust system. The composite of the aluminum sheet and glass fiber mat is shaped to the contours of the vehicle by conventional processes, such as deep drawing, combined deep drawing-stretching forming, bending and crimping. The so-formed shield is then applied to the vehicle by a special clamp. While this approach provides a good thermal and acoustical insulation, it still requires conventional forming techniques, as noted above, to configure the shield to the object to be protected and also requires special clamps for affixing the shield to the vehicle. All of this is expensive and time consuming in assembly of the automobile and does not solve the problem or severely limited space in modern designs, as noted above.

As can be appreciated from the above, it would be of particular advantage in the art to provide a thermal and acoustical insulating shield which is flexible, so that it may be manually applied to the vehicle contours, or other structure, without having to be preformed in conventional shaping processes, and which shield is adhesively attachable to the object to be protected and without the need of any mechanical attaching devices, such as clamps, bolts, screws, welds and the like.

In the above-noted U.S. patent application Ser. No. 09/033,852, a flexible, adhesively attachable thermal and acoustical insulating shield is disclosed. According to the invention disclosed in that application, it was found that the needling technique of U.S. Pat. No. 4,522,876, described above, could be modified such that, in needling organic fibers from the organic fiber layers sandwiching the inorganic fiber layer, tufts of the organic fibers can protrude from opposite outer sides of the organic fiber layers so as to form a tufted upper surface and a tufted lower surface of the needled batt.

An adhesive is applied to the tufted upper surface and tufted lower surface of the batt, such that the tufts on the upper and lower surfaces are secured to those surfaces by the adhesive. This prevents the tufts from being pulled from that surface during high static or dynamic loading of the shield, as would be encountered by use in an automobile, and, thus, provide very high Z-directional strength to that composite batt.

To the adhesive applied on the lower surface of the batt, a flexible protective foil is permanently adhered by the adhesive to the lower surface of the batt. This provides a lower protective surface to the composite batt to prevent mechanical damage, e.g. from rocks and other debris on the road, while at the same time providing radiation insulation to the shield.

The adhesive on the upper surface of the batt is an activatable adhesive, such as a pressure-sensitive adhesive and a flexible, strippable foil is releasably adhered to a pressure-sensitive adhesive on the upper side of the batt, such that, by removing the strippable foil, the shield may be merely flexed and pressed to configure and permanently attach the upper surface of the shield to the object to be shielded. Thus, no forming apparatus or attachment means, such as clamps, bolts, screws, welds and the like, are required to permanently configure and place the shield onto the vehicle, e.g. underneath the floor pan to protect the floor pan from exhaust components.

When the batt of the composite organic and inorganic fibers is of certain thicknesses and the protective foil is of certain materials and certain thicknesses, the shield can be easily manually deformed by a worker when placing the shield next to the contours of the object to be protected, and, accordingly, no preforming, such as conventional stamping, drawing, etc., is required, although such preforming can be practiced if desired.

Since the shield is adhesively attached directly to the object to be protected, there is no need for a clearance between the object to be protected, e.g. the floor pan, and the shield itself, which allows the use of that shield in the very restricted and diminished spaces of modern automobile designs. However, with the combination of the protective foil, particularly when that foil is a radiation barrier foil, and the composite batt, high thermal insulation and high acoustical insulation results.

When pressing the protective foil and/or the strippable foil to the adhesive covered upper and lower tufted surfaces and when pressing the shield to the contours of the object, the tufts on the surfaces, embraced by the adhesive, tend to bend and compress from the vertical, further locking those tufts into the surfaces of the batt. This provides even greater strength to the batt in the Z direction, because the bent or compressed tufts, somewhat like bradding, become very difficult to separate from the surfaces of the batt and, thus, hold that batt in the Z direction with great strengths, and which strengths can avoid separations of the batt during high static and dynamic loadings on the batt.

Thus, the invention in that application provides a flexible, adhesively attachable, thermal and acoustical insulating shield. The shield has a needled, flexible, fibrous batt having an insulating layer of insulating fibers disposed between opposite binding layers of binding fibers. Binding fibers of each binder layer are needledly disposed through the insulating layer and an opposite binding layer to provide tufts of binding fibers protruding from that opposite binding layer. This forms a tufted upper surface and a tufted lower surface of the batt. An adhesive is disposed and adhered substantially over the upper tufted surface and the lower tufted surface of the batt such that the tufts on the tufted upper and tufted lower surfaces are secured to those surfaces by the adhesive. A flexible, protective foil is permanently adhered by the adhesive to the tufted lower surface of the batt.

The shield may be flexed and pressed to configure and permanently attach the upper surface to an object to be protected.

The invention in that application also provides a method of applying the shield of the invention to an object to be thermally and acoustically protected. In this method, the upper surface of the batt, with the adhesive exposed thereon, is pressed at the protective foil sufficiently to configure the shield to the contours of the object to be protected, and the pressure-sensitive adhesive is caused to permanently adhere to the contours of that object. Thus, by this method, the shield can be placed directly and permanently on the object to be protected and without the need of any attachment devices, such as bolts, screws, welds, clamps and the like.

The invention of that application also provides that the shield may be closed at its peripheries, as shown in FIG. 8 of that application, where the insulating batt is enclosed within protective foils by sealing the peripheries of those protective foils and then placing the pressure-sensitive adhesive and strippable foil on the top thereof. This arrangement prevents egress of moisture, contamination, dirt, dust and the like into the insulating material, which is a very desirable feature, but that approach does require two protective foils, sandwiching the insulating material, with the peripheries of the foils being sealed in a separate sealing step. It further requires the separate step of placing the adhesive and the strippable foil on the upper surface of the uppermost protective foil.

As can be appreciated, this results in a more expensive insulating shield, and in that sense, the arrangement for enclosing the insulating material is not as desired.

It would, therefore, be of substantial advantage to the art to provide means of sealing the insulating material of that application from egress of moisture, dust, dirt and other road contamination without the additional expense of the arrangement noted in that application, as briefly discussed above. It would, further, be of a substantial advantage to the art to make such shield a self-sealing shield, so as to prevent egress of moisture, dust, dirt and the like.

SUMMARY OF THE INVENTION

Thus, the present invention provides a flexible, adhesively attachable, self-sealing, thermal and acoustical insulating shield. The invention is based on several primary and subsidiary discoveries.

First of all, it was found that the protective foil of the above-noted U.S. application could be extended so as to have edge portions which extend beyond the edges of the fibrous batt insulating material. These edge portions, therefore, provide the ability of the shield to be self-sealing, in that those edge portions can be pressed against the object to be protected so that the fibrous batt insulating material is enclosed between the protective foil, its edge portions and the object to be protected.

As another discovery, it was found that those edge portions could be provided with a flexible adhesive disposed and adhered substantially over edge upper surfaces of the edge portions. Thus, when those edge portions, as well as the shield itself, are pressed against the object to be protected, those edge portions, with the adhesive on edge upper surfaces, can be adhesively attached to the object to be protected and, thus, seal the fibrous batt insulating material between the protective foil, its edge portions and the object to be protected.

It was also found that, with such approach, the present shield is self-sealing in that it is totally sealed to the object to be protected by the adhesive at the upper surfaces of the edge portion.

As a subsidiary discovery, it was found that the same adhesive used for adhering the protective foil to the tufted lower surface of the fibrous batt insulating material can be used on the edge upper surfaces of the edge portions as, simply, a continuation of that adhesive. This makes the application of the adhesive to the edge upper surfaces very convenient.

As a subsidiary discovery, it was found that, with this approach, very little expense is involved, i.e. only the additional amount of protective foil which provides the edge portions and the additional amount of adhesive disposed on edge upper surfaces of the edge portions. This is a very small incremental increase in the cost of the shield, but with this improvement, the shield thus becomes a self-sealing thermal and acoustical insulating shield.

Accordingly, briefly stated, the present invention provides a flexible, adhesively attachable, self-sealing, thermal and acoustical insulating shield. Just as in the above-noted U.S. patent application, the shield has a needled, flexible, fibrous batt having an insulating layer of insulating fibers disposed between opposite binding layers of binding fibers. Binding fibers of each binding layer are needledly disposed through the insulating layer and an opposite binding layer to provide tufts of binding fibers protruding from that opposite binding layer. This forms a tufted upper surface and a tufted lower surface of the batt. A flexible adhesive is disposed and adhered substantially over the tufted upper surface of the batt such that the tufts on the tufted upper surface are secured to that surface by the adhesive. A flexible, protective foil is disposed adjacent to the tufted lower surface of the batt.

In the present improvement, the protective foil has edge portions which extend beyond edges of the fibrous batt. Those edge portions have a flexible adhesive disposed and adhered substantially over edge upper surfaces of the edge portions. Thus, the shield may be flexed and pressed to configure and permanently attach the tufted upper surface to an object to be shielded and the edge portions may be pressed to permanently attach the edge upper surfaces of the edge portions to an object to be shielded so as to self-seal the edge portions, and hence the shield, to that object.

Also, the present invention provides a method for producing the above-described flexible, adhesively attachable, self-sealing thermal and acoustical insulating shield. The method comprises forming the above-described fibrous batt, needling that batt to provide the binding fibers as described above, applying and adhering the flexible adhesive over the tufted upper surface as described above, and applying the flexible, protective foil, as described above.

The improvement in the method is where the protective foil had edge portions which extend beyond edges of the fibrous batt. Those edge portions have a flexible adhesive disposed and adhered substantially over edge upper surfaces of the edge portions. Thus, the shield may be flexed and pressed to configure and permanently attach the tufted upper surface to an object to be shielded and the edge portions may be pressed to permanently attach the edge upper surfaces of the edge portion to the object to be shielded so as to self-seal the edge portions, and hence the shield, to the object.

Further, there is provided a method for applying that shield to an object to be thermally and acoustically protected. In that method, the adhesive on the tufted upper surface and on the edge upper surfaces is exposed, e.g. by removing a strippable foil therefrom. The fibrous batt is then pressed at the protective foil to configure the shield to contours of the object to be shielded and causing the adhesive on the tufted upper surface to permanently adhere to the contours and pressing the edge portions against the object to permanently seal the edge portions, and hence the shield, to the object and, thus, provide a self-sealing shield.

DESCRIPTION OF PREFERRED EMBODIMENTS

Figure 1:
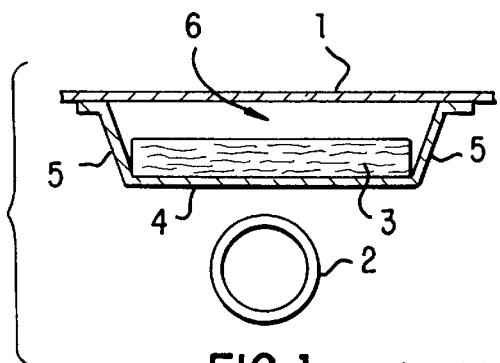
FIG. 1 is a diagrammatic illustration of prior art shields.

The prior art shields of the present nature were provided with an air gap between the shield and the object to be protected, and those shields were generally hung (suspended) from that object by clamps, bolts, screws, welds, and the like. FIG. 1 illustrates such prior art, e.g. such as the device of the Behdorf et al patent described above. As can be seen from FIG. 1, an object 1 to be shielded, i.e. protected, could be, for example, the floor pan of an automobile. The heat source 2 could, for example, be part of an exhaust system of an automobile. As shown in FIG. 1, the shield 3 (usually a fibrous insulation batt) is held by a support 4 and spaced from object 1 by brackets or clamps, etc., 5 so that an air gap, generally, 6 is between object 1 and shield 3. This air gap 6 and the shield 3, in combination, provide relatively good thermal and acoustical insulation, but, as can be seen from FIG. 1, the combination of the shield 3, support 4, brackets or clamps 5 and air gap 6 requires considerable space in the automobile, which is not acceptable with modern designs. Furthermore, shields of that nature are time consuming to install and expensive.

Figure 2:
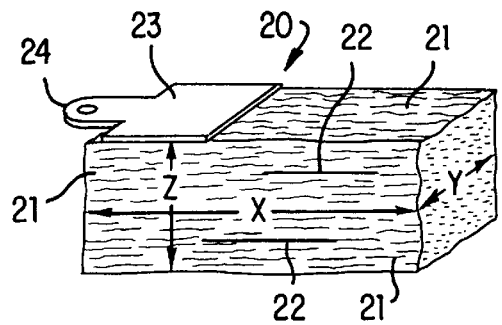
FIG. 2 is a diagrammatic illustration showing another form of prior art shields.

The reason that the prior art required such arrangements, as briefly noted above, is that in prior art shields of the present nature, the Z-directional strength of fibrous insulation batts is not sufficient for the shield to sustain substantial static and dynamic loadings as would be incurred in a modern automobile. FIG. 2 illustrates a prior art fibrous insulation batt material, typically made of glass fibers. In FIG. 2, the batt, generally, 20 has a number of glass fibers 21 disposed generally in the X, Y directions. While those glass fibers 21 can be significantly interlocked in the X, Y directions, by virtue of the method by which glass fiber batts are made, i.e. air laying of glass fibers, those fibers are not significantly interlocked in the Z direction. Therefore, those batts have very little tensile strength in the Z direction, and the batts 20 can easily separate at various planes 22 in the Z direction. Thus, for example, if the batt has a covering 23 (shown in part in FIG. 2) for suspending the batt 20 via an attachment 24, the Z-directional strength is not sufficient to prevent the batt from separating, e.g. at planes 22, under prolonged static and dynamic loading as might be occasioned, for example, in an automobile.

Figure 3:
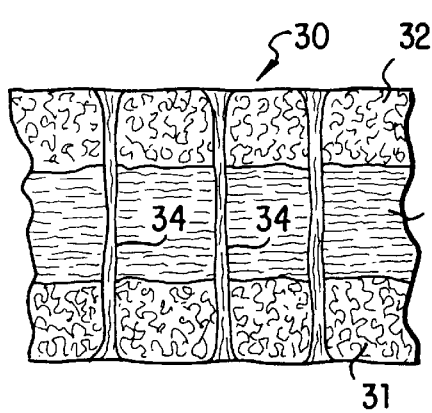
FIG. 3 is a diagrammatic illustration showing prior art needling of an inorganic fiber layer sandwiched between inorganic fiber layers.

As also briefly described above, U.S. Pat. No. 4,522,876 to Hiers discloses a means of substantially increasing the Z-directional strength of inorganic fiber batts, e.g. glass fiber batts, and FIG. 3 is illustrative thereof. In that figure, the batt, generally, 30 has layers 31 and 32 of organic textile fibers sandwiching a glass fiber layer 33. By needle punching, in the manner described in that patent, organic fibers from organic fiber layers 31 and 32 are formed into stitches 34 which proceed from one of the organic fiber layers 31 and 32, through the glass fiber batt 33 and into the opposite organic fiber layer 31, 32. By using the needling technique disclosed in that patent, a large number of such stitches 34 can be utilized in needling that composite batt so as to provide very high Z-directional strength. Those Z-directional strengths are acceptable for many applications, but where very high Z-directional strengths are required, such as in shields for automobiles, separation of the batt in the Z direction can occur, especially under the conditions of long-term repetitive high static or dynamic loading.

Figure 4:
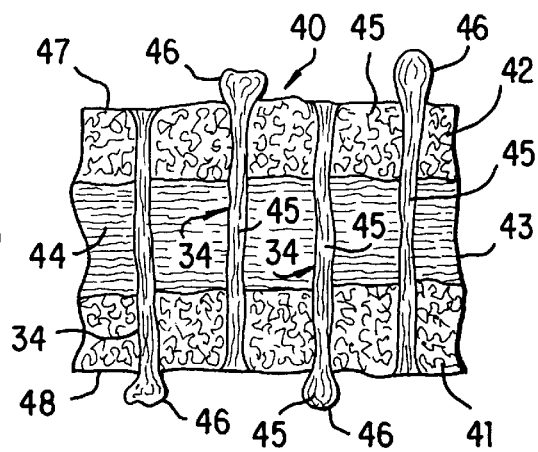
FIG. 4 is a diagrammatic illustration showing the tufted surfaces of the invention, as described in the copending application.

The present shield uses a needled insulation batt similar to that of the Hiers patent, but modified, i.e. where the needling has been modified to provide tufts on opposite surfaces of the needled insulation batt. As shown in FIG. 4, the present insulation batt, generally, 40 also has organic fiber layers which function as binding layers 41 and 42. An insulating layer 43 of insulating fibers 44 is disposed between opposite binding layers 41 and 42 of binding fibers 45. Binding fibers 45 of each binding layer are needledly disposed through the insulating layer 43 and an opposite binding layer 41, 42 to provide tufts 46 of binding fibers 45 protruding from the opposite binding layer so as to form a tufted upper surface 47 and a tufted lower surface 48 of insulation batt 40. In this regard, and as used in this specification and claims, the terms upper and lower are intended only as identifier designations and are not intended to indicate direction.

The tufts 46 on opposite surfaces, i.e. tufted upper surface 47 and tufted lower surface 48, lock the binding fibers 45 (in the form of stitches, generally 34) such that those stitches 34 cannot pull through the composite upon high static or dynamic loading in the Z direction of the insulation batt 40. The presence of these tufts 46 greatly increases the Z-directional strength of the so-needled batt, but the needling still leaves the insulation batt very flexible, so that the batt can be easily bent to desired configurations.

Figure 5:
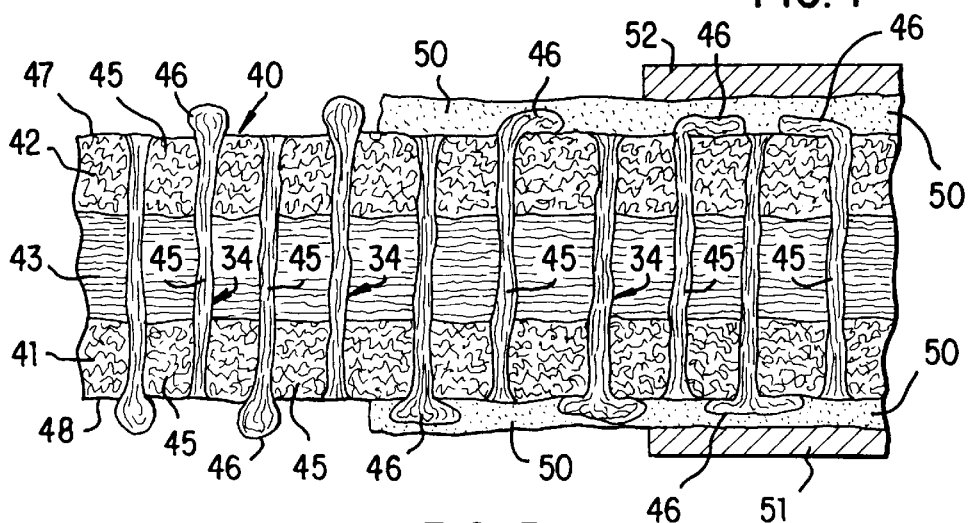
FIG. 5 is a diagrammatic illustration showing the tufts, adhesive and foils assembled to form the shield, as described in the copending application.

While the tufts 46 provide very high Z-directional strength that Z-directional strength is further increased, as shown in FIG. 5. In that figure, a flexible adhesive 50 is disposed and adhered substantially over the tufted upper surface 47 and preferably over tufted lower surface 48 (shown only partially disposed in FIG. 5 for clarity). The application of the adhesive 50 causes the tufts 46 to be somewhat deformed or bent from the plane of surface 47 and, preferably surface 48, of insulation batt 40 such that the tufts 46 on the tufted upper surface 47, and preferably tufted lower surface 48, are secured to the surfaces 47, 48 by the adhesive 50. That distortion of tufts 46 greatly increases the resistance of the binding fibers 45 from pulling from the opposite surface and therefore causing a failure (separation) of the batt in the Z direction. In addition, once the adhesive 50 is set, that adhesive adheres the tufts 46 to the respective surfaces 47, 48, and this further increases the Z-directional strength of the insulation batt 40.

However, that Z-directional strength is even further increased, as also shown in FIG. 5. A flexible, protective foil 51 (only partially shown in FIG. 5 for clarity) is disposed adjacent to, and preferably, permanently adhered by the adhesive 50 to, the lower surface 48 of the insulation batt 40, and in the application of that foil 51, tufts 46 are further distorted, e.g. flattened, bent, splayed, bradded, and the like, so as to further increase the resistance of binding fibers 45 of stitches 34 from pulling through the batt 40 upon high static or dynamic loading.

Preferably, but not required, a flexible, strippable foil 52 (only partially shown in FIG. 5 for clarity) is releasably adhered by adhesive 50 to the tufted upper surface 47 of insulation batt 40. Thus, similar to the effect of protective foil 51, the application of strippable foil 52, likewise, distorts tufts 46 and further locks and secures those tufts to tufted upper surface 47.

However, a strippable foil is not required, especially for the reasons explained below. When a pressure-sensitive adhesive is used, however, it is necessary to protect the pressure-sensitive adhesive from inadvertently sticking to some object during shipping and handling of the shields. This can be done, however, simply by inserting a release foil between stacked shields, as shown in FIG. 6A, where a stack, generally, 60 of the shields 61 has a release foil 62 between shields 61 and over the upper surface 47 of insulation batt 40 with a pressure-sensitive adhesive 50 thereof (see FIG. 5). Thus, such a stack 60 can be shipped and handled. From the stack 60, individual shields 61 can, therefore, be serially removed for application to a series of objects to be protected, e.g. a series of automobiles in a production line.

When a shield 61 is removed from the stack, the upper surface 47 has the pressure-sensitive adhesive 50 exposed and when that upper surface is pressed onto an object to be protected, as explained in more detail below, the tufts 46 will be further distorted, in the same manner as described above in connection with application of the protective foil 51 to the adhesive. Accordingly, the same results of the in-place shield will follow when a release foil is used between shields in a stack of shields as occurs when a strippable foil is used. However, care must be taken to ensure that the stack remains in place to protect the pressure-sensitive adhesive 50 on the upper surface 47. In addition, a preforming operation, as described below, would be difficult to perform with only a release foil. For this reason, the strippable foil is preferred. The release foil may be made of the same material as the strippable foil, as discussed below.

Figure 6B:
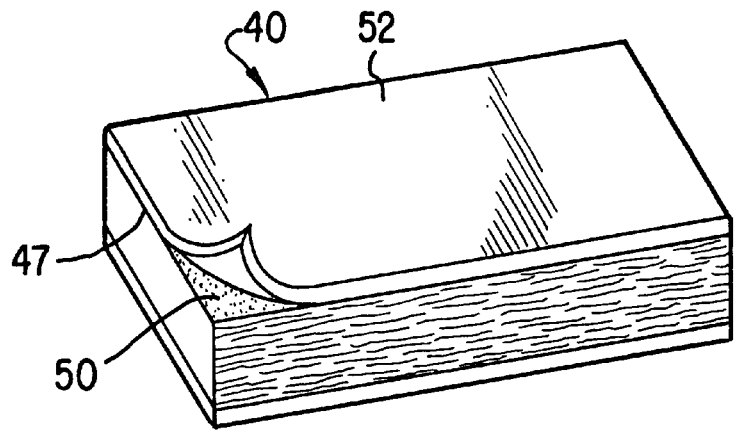
FIG. 6B is a diagrammatic illustration of an embodiment of the invention described in the copending application where a strippable foil protects adhesive on an upper surface of the shield.
Figure 6A:
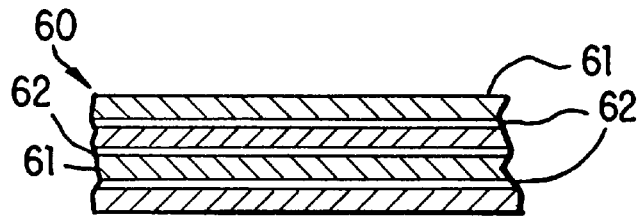
FIG. 6A is a diagrammatic illustration of a stack of shields of the invention, separated by release foils, as described in the copending application.

The shield shown in FIG. 6B has a strippable foil 52 releasably adhered by a pressure-sensitive adhesive 50 to the upper surface 47 of insulation batt 40 such that, by removal of strippable foil 52, as indicated in FIG. 6B, the shield may be flexed and pressed to configure and permanently attach the tufted upper surface 47 to an object 1 to be protected.

Figure 6C:
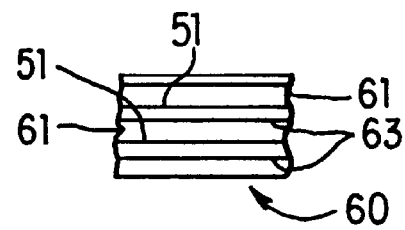
FIG. 6C is a diagrammatic illustration of a stack of the shields, as described in the copending application.

Instead of release foil between shields of a stack of shields, the lowermost surface of protective foil 51 can be coated with a release coating so that stacked shields can be handled and then separated. This embodiment is shown in FIG. 6C, where each shield 61 has a coating 63 of a release material on the lowermost surface of protective foil 51.

The insulation batt 40 may be of various thicknesses, depending upon the degree of thermal and acoustical insulation required, the particular binding fibers 45 of binding layers 41, 42 and the particular insulating fibers 44 of insulating layer 43. However, generally speaking, the insulation batt 40 will have a thickness of between about 0.1 to 2.0 inches. Similarly, depending upon the fibers and application, the weight ratio of the insulating layer 43 to each binding layer 41, 42 can vary considerably, but, generally speaking, that ratio will be between about 0.5 and 12.0:1. The weight of each of the binding layers 41, 42 can be different, depending upon the application, but usually, for most applications, the weight of each binding layer is substantially the same.

The insulating fibers preferably will be any of the usual inorganic fibers, such as glass fibers, mineral fibers, alumina fibers and the like, but, more usually, the insulating fibers are glass fibers. However, where the requirement for thermal insulation is lower and the requirement for acoustical insulation is higher, the insulating fibers need not be inorganic fibers and may be, at least in part, organic fibers, such as polyester fibers, nylon fibers and the like. Those fibers may be solid or hollow, the latter of which provides a greater thermal insulation.

The binding fibers are normally organic fibers, such as polyester fibers, nylon fibers, olefin fibers, and cellulose acetate fibers.

The denier of the insulating fibers can vary considerably, but, generally speaking, deniers from about 0.1 to 25 are acceptable in most applications. Likewise, the denier of the binding fibers, e.g. organic fibers, can vary widely, but more usually that denier will be between about 2 and 15.

The fiber length of the insulating fibers can be from very short lengths, e.g. 50 microns, up to fairly long lengths, e.g. 5 inches. Fiber lengths of the binding fibers will normally be between about 0.2 and 8.0 inch.

The needle density in preparing the batts can vary widely, depending upon the Z-directional tensile strength required for the anticipated static or dynamic loading on the shield. However, the needledly disposed binding fibers 45, as shown in FIG. 5, will generally have a needling density of between about 500 and 10,000 needle punches per square inch of the batt 40. Thus, there are, likewise, between about 500 and 10,000 tufts 46 per square inch on the tufted upper surface 47 and the tufted lower surface 48. However, more usually, there will be between about 700 and 5,000 tufts 46 per square inch on the tufted upper surface 47 and the tufted lower surface 48.

The increased strength of the needled insulation batt 40, especially in the Z-direction, is generally proportional to the number and size of the tufts. Aside from the number of tufts, as described above, the tufts should have a size such that the increase in strength of the batt in the Z-direction is at least 50% per 1,000 tufts per square inch, and more preferably about at least 100% per 1,000 tufts per square inch, as opposed to the same batt material but untufted. The increase can, however, be much higher.

The adhesive can be any desired known adhesive, but preferably the adhesive is an activatable adhesive, such as an adhesive activated by heat, a solvent or pressure, e.g. a conventional polyester adhesive. Thus, the adhesive may be activated by heating with a hot air gun or an I.R. heater or hot roll or block or activated by spraying or brushing a solvent thereonto or activated by pressure (pressure-sensitive adhesive), all of which are well known in the art. The preferred adhesives, however, are a pressure-sensitive adhesive or heat activatable adhesive. The adhesive may be applied by spraying, coating or a "transfer tape" (a film of adhesive on one or both sides of a foil or paper). The pressure-sensitive adhesive of a preferred embodiment may be chosen from a wide variety of known pressure-sensitive adhesives, but a preferred pressure-sensitive adhesive is the commercial acrylate adhesive, and particularly methacrylate adhesive and ethyacrylate adhesive.

The protective foil 51 can be of a variety of materials, e.g. plastics, metals, fabrics (woven and non-woven) and the like, but it is preferable that the protective foil 51 be either a metal foil, especially aluminum foil, or a plastic foil, especially a polyester plastic foil. More preferably, the foil will have a heat-reflecting color, either naturally or as a pigment in the foil or as a coating on the foil. For example, where the foil is made of aluminum, the aluminum, per se, has a heat-reflective color. On the other hand, where the foil is a plastic foil, such as polyester foil, that polyester foil can be coated with aluminum to provide a heat-reflective color. The thickness of the protective foil can vary considerably, but generally the thickness of the foil will be between about 1 mil and 100 mils, although thicknesses will more generally be between about 2 mils and 10 mils.

Somewhat similarly, the strippable foil 52 or the release foil 62 may be a metal or a plastic or a textile or a paper, but it is preferred that the foil is a conventional 1.5 mil polyethylene terephatlate film with silicone coating on one side as the release agent. The strippable foil or release foil can have any conventional release coating, e.g. a polyolefin coating, on any side thereof which contacts an adhesive, e.g. pressure-sensitive adhesive, so that the foil may be easily removed from the shield to expose the adhesive for adhering the shield to a surface of the object to be protected. The foil can be of any desired thickness, but generally that thickness will be between about 1 mil and 50 mils.

Figure 7:
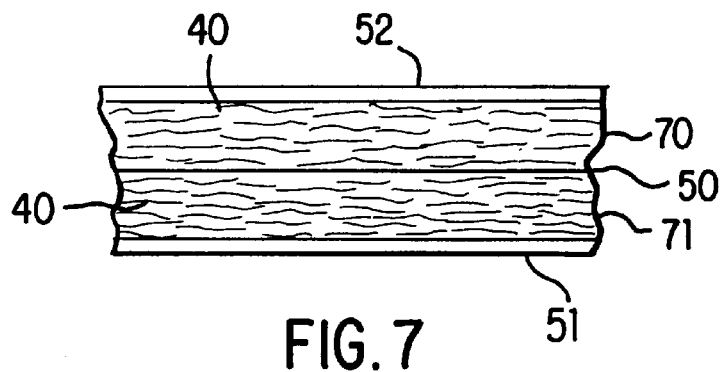
FIG. 7 is a diagrammatic illustration of another embodiment of the invention, as described in the copending application.

The shield may also be in the forms of layers of shields, such as shown in FIG. 7, where the shield has two layers 70 and 71 of batts 40 adhered together by adhesive 50 and having the protective foil 51 and the strippable foil 52 (or release foil 62). Of course, more than two layers could be used.

Figure 8:
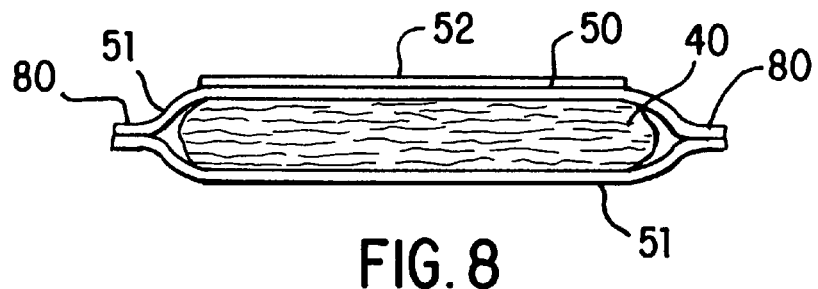
FIG. 8 is a diagrammatic illustration of an embodiment of a sealed shield, as described in the copending application.

The shield of the copending application may be closed at its peripheries, as shown in FIG. 8, where the batt 40 is enclosed within protective foil 51 by sealing the periphery 80 of the protective foil 51 and then placing the pressure-sensitive adhesive 50 and strippable foil 52 on top thereof. This, however, as explained above, is expensive and not as desired.

Figure 9:
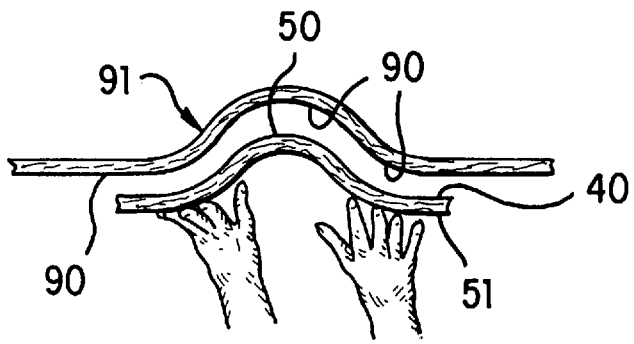
FIG. 9 is a diagrammatic illustration of the application of the shield to an object to be protected, as described in the copending application.

The shield, as described above, may be applied to an object for thermally and acoustically protecting that object. As shown in FIG. 6B, by removing the strippable foil 52 from the tufted upper surface 47 of the batt 40 (or removing a shield from stack 60, as shown in FIG. 6C), the pressure-sensitive adhesive 50 thereon is exposed. As shown in FIG. 9, the copending application teaches that by pressing the batt 40 at the protective foil 51 sufficiently to configure the shield to contours 90 of the object, generally, 91 to be protected, this causes the pressure-sensitive adhesive 50 to permanently adhere to the contours 90. Preferably, the pressing at the protective foil 51 is a manual pressing, as shown in FIG. 9. However, prior to removing the strippable foil 52, the shield may be subjected to a preforming step to conform the shield to the general contours 90 of the object 91. This will allow less manual forming of the shield to the contours 91 where the contours are quite complex in configuration.

Figure 10:
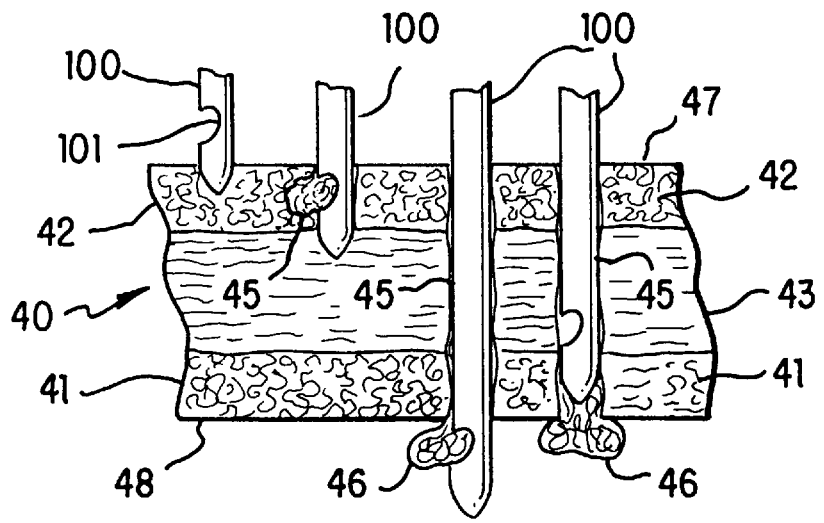
FIG. 10 is a diagrammatic illustration of the needling technique used to produce the fibrous batt, as described in the copending application

The needling used in producing the present batt is illustrated in FIG. 10. As a needle 100 having a barb 101 begins to penetrate binding layer 42, the barb 101 picks up and is essentially loaded with binding fibers 45 in that barb. The needle then passes though insulating layer 43 without picking up substantial insulating fibers since the barb is essentially loaded. The needle then passes through the opposite binding layer 41 such that the barb penetrates below the tufted lower surface 48 and presents a tuft 46 beyond that tufted lower surface 48. As the needle 100 is withdrawn back through binding layer 41, that tuft 46 remains at the tufted lower surface 48. Of course, during that needling operation, as is common with barbed needles, binding fibers 45 will also be pulled with the needles to form stitches 34 of those binding fibers, as shown in FIG. 5. Thus, with the retraction of the needle 100, the tufts 46 which terminate the stitches 34 of fibers 45 remain on the surface. By using conventional needling machines, where needling is conducted from both sides of batt 40, tufts will be disposed on both the tufted upper surface 47 and the tufted lower surface 48, as shown in FIG. 5.

To achieve the tufted surfaces, at least the lowermost barb of any needle should pass through tufted lower surface 48 or tufted upper surface 47, depending upon the needle direction, sufficiently such that the tufted fibers remain on the respective surface when the needle 100 is withdrawn from the batt 40. Generally speaking, that lowermost barb should penetrate beyond surface 48 (or surface 47) by at least about 1/16 inch, more preferably at least about 1/8 inch, e.g. about 1/3 inch, and even up to as much as 1/2 inch or 3/4 inch. This will ensure that a substantial tuft is placed on the surface with each needle punch.

Figure 11:
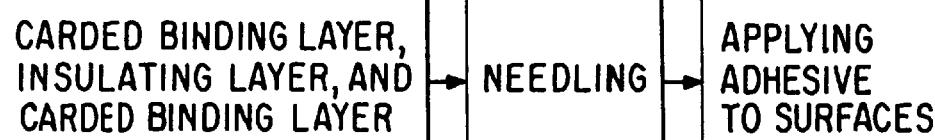
FIG. 11 is a block diagram of the process for making the shield, as described in the copending application.

The generalized overall process of producing the present shield is shown in FIG. 11. To produce the present shield, a flexible fibrous batt of an insulating layer of insulating fibers is disposed between opposite carded binding layers of binding fibers, i.e. formed by carding a binding layer, then placing an insulating layer thereover, either preformed or by carding, and then carding a binding layer thereover, all in the conventional manner. Thereafter, the batt is needled in the manner described in connection with FIG. 10 such that the binding fibers 45 of each binding layer 41, 42 are needled through the insulating layer 43 and opposite binding layer 41, 42 to provide tufts 46 of binding fibers 45 protruding from the opposite binding layer 41, 42 so as to form a tufted upper surface 47 and a tufted lower surface 48 of batt 40. The adhesive 50 is applied to the tufted upper surface 47 and the tufted lower surface 48 of batt 40 such that the tufts 46 on the tufted upper surface 47 and tufted lower surface 48 are secured to surfaces 47, 48 by the adhesive 50. A flexible, protective foil 51 is applied to, and preferably permanently adhered by the adhesive 50 to, the tufted lower surface 48 of the insulation batt 40, and, preferably, a flexible, strippable foil 52 is applied and releasably adhered by the adhesive 50 to the tufted upper surface 47 of the batt 40.

Thus, the shield may be flexed and pressed to configure and permanently attach the upper surface 47 to the object to be shielded 91.

FIGS. 12 through 15 show, in detail, the present improvement. As will be seen from those figures, the present improvement functions in the same manner as the shield of the copending application in connection with attaching the shield to an object 1 by way of a flexible adhesive 50 disposed and adhered substantially over the tufted upper surface 47. In the same manner of the shield of the copending application, the protective foil 51 adjacent to, and preferably permanently adhered by adhesive 50 to, the tufted lower surface 48. However, in the present improvement, the protective foil 51 has edge portions 112, which extend beyond edges 113 of the fibrous batt 40. Those edge portions 112 have a flexible adhesive 114 disposed and adhered substantially over edge upper surfaces 115.

Figure 13:
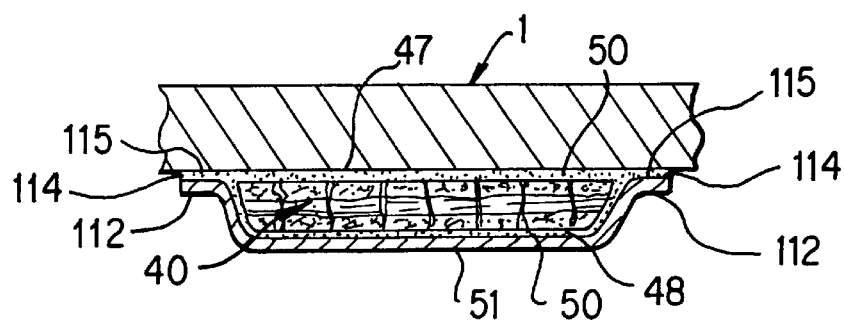
FIG. 13 is similar to FIG. 12, but shows edge portions sealed to the object to be shielded.

Thus, when the shield is flexed and pressed to configure and permanently attach the tufted upper surface 47 to the object 1 to be shielded, the edge portions 112 are also pressed to permanently attach the edge upper surfaces 115 of the edge portions 112 to the object 1 to be shielded so as to self-seal the edge portions 112 to the object 1, as shown in FIG. 13.

Figure 12:
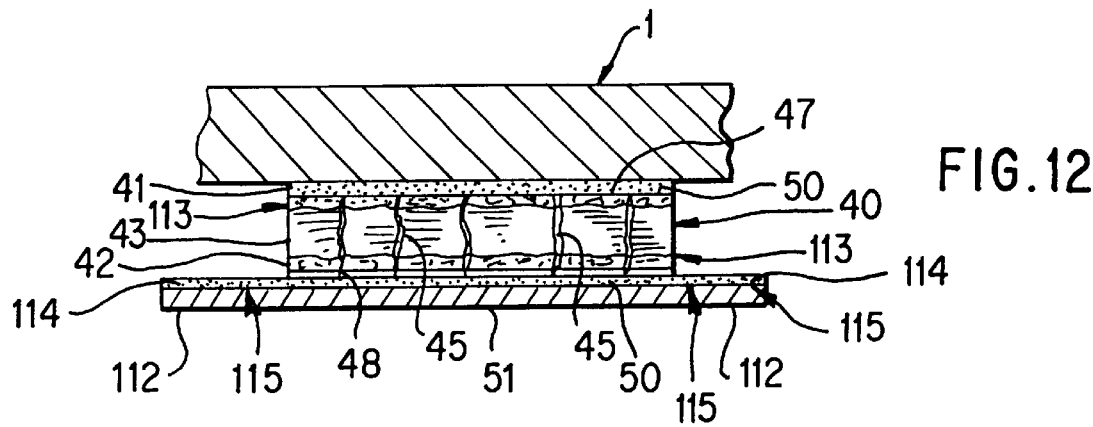
FIG. 12 is a diagrammatic illustration of the present improved shield partially adhered to an object to be shielded.

The flexible adhesive 114 can be the same or different adhesive as the flexible adhesive 50 on the tufted upper surface 47 and/or the tufted lower surface 48 of insulation batt 40. Indeed, as shown in FIG. 12, the adhesive 114 is simply a continuation of an adhesive 50 applied to the tufted lower surface 48. This greatly simplifies the application of the adhesive 114 to the present improvement. Thus, the adhesive 114, in terms of its composition and alternatives, can be exactly the same as the adhesive 50 described above in connection with the adhesive of the copending application or other adhesives.

As an alternative and as best seen in FIG. 13, the adhesive 50 on the tufted upper surface 47 may extend onto edge portions 112. In this arrangement, with or without the adhesive 50 on tufted lower surface 48, the batt 40 is sealed, during manufacture of the shield, between foil 51 and adhesive 50 on upper tufted surface 47 to make a liquid tight enclosure of batt 40 even before pressing the shield during installation thereof. When the edge portions 112 are pressed so as to permanently attach the upper edge surfaces 115 to the object 1, in addition to the pressing of protective foil 50 to adhere the tufted upper surface 47 to object 1 by way of adhesive 50, then the entire shield becomes self-sealing between protective foil 51, edge portions 112 and object 1. This, of course, will prevent egress of moisture, road dust, dirt and the like from entering into the shield during use of the shield, for example, on an automobile. In addition, adhered edge portions 112 increase the adherence of the total shield to object 1.

Figure 14:
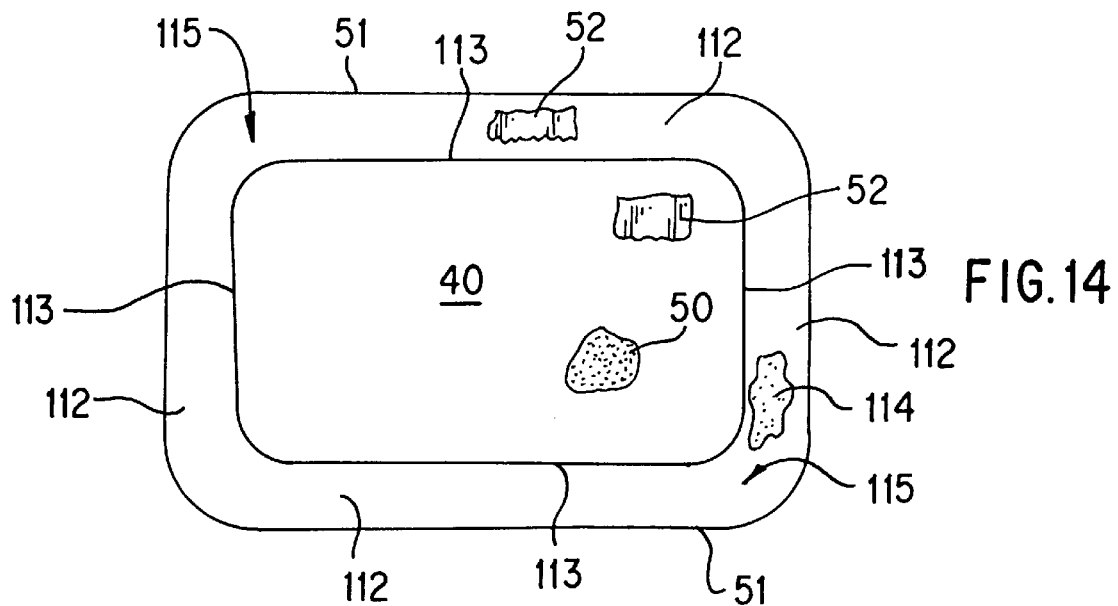
FIG. 14 is a top view of a shield according to the present improvement.
Figure 15:
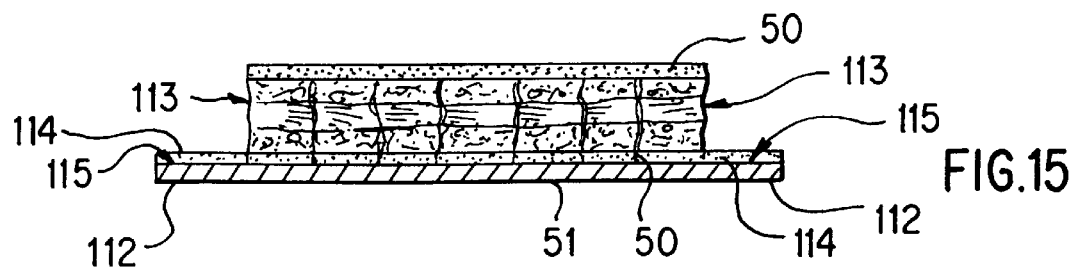
FIG. 15 is a diagrammatic illustration of the present improved shield.

As best seen in FIGS. 14 and 15, the protective foil 51 has edge portions 112 which embrace the fibrous insulation batt 40. Those edge portions 112 have adhesive 114 (only partially shown in FIG. 14), which, as noted above, can simply be an extension of adhesive 50 (see FIGS. 12 and 13). In addition, in the preferred embodiment, a strippable foil 52 (only partially shown in FIG. 14) is placed over the entire shield for the purposes described above in connection with the shield of the copending application. Thus, in applying the shield to object 1, the strippable foil is removed from both the adhesive 50 and the adhesive 114 (as noted above, these may be the same or different adhesive), so as to expose the adhesive on the tufted upper surface and the edge upper surface 115. Then, as shown in FIG. 9, insulation batt 40 is pressed at protective foil 51 to configure the shield to contours 90 of the object 91 to be protected and causing adhesive 50 on the tufted upper surface 47 to permanently adhere to the contours 90. At the same time, the edge portions 112 (see FIGS. 12 and 13) are pressed against the object (91 in FIG. 9 and 1 in FIGS. 12 and 13) to permanently seal the edge portions 112 to that object.

The edge portions 112, as best seen in FIG. 14, should extend beyond edges 113 of the fibrous insulation batt 40 sufficiently to allow the edge portions 112 to be configured, bent and adhered to object 1, as shown in FIG. 13. Of course, how much the edge portions 112 should extend beyond edges 113 of fibrous insulation batt 40 depends upon, among others, the thickness of insulation batt 40 and how much sealing between the edge portions 112 and the object 1 is desired. However, generally speaking, the edge portions can extend beyond edges 113 from about one-half to about one inch and still provide good self-sealing with quite acceptable increase in cost of the shield, although edge portions greater or less than this may be used if so desired.

As will be easily appreciated, the general overall process for producing the present improved shield is that as described above, with the exception that the adhesive 50 is better applied to protective foil 51 than to the lower tufted surface 48 of insulation batt 40. This eliminates a separate step of applying the adhesive 114 to edge portions 112. By applying the adhesive to an upper surface of the protective foil 51, and then placing the fibrous insulation batt 40 thereon, the adhesive 114 at edge portions 112 will automatically be in place and no separate adhesive applying step to the edge portions is required. Further, and in addition, the strippable foil 52 will be applied not only to the adhesive 50 on the tufted upper surface 47, but to the adhesive 114 on edge portions 112.

One means of placing adhesive 50 onto tufted upper surface 47 and on edge portions 112, when not applied to edge portions 112 as generally described above, is by use of a "transfer tape", as briefly described above. A transfer tape has a film of pressure-sensitive adhesive adhered to a strippable foil. Thus, that transfer tape can be placed over tufted upper surface 47 and edge portions 112 and pressed such as to fully adhere the tape with the release foil thereon to tufted upper surface 47 and the edge upper surfaces 115 of edge portions 112. In this process, therefore, the adhesive on the tufted upper surface 47 and the edge portions 112 is applied in a single step and with the release foil 52 already applied thereto. In this means of assembling the shield, of course, adhesive 50, preferably, is applied to tufted lower surface 48 and/or protective foil 51 and is pressed thereagainst to adhere the fibrous insulation batt 40 to the protective foil 51 or vice versa. Thereafter, the "transfer tape" is applied, as described above. However, in some applications where high strengths are not required, no adhesive between the tufted lower surface 48 and protective foil 51 is required. In such applications, the adhesive 50 is not applied to tufted lower surface 48 and the entire shield is assembled by pressing a laid-up combination of protective foil 51, insulation batt 40 and the transfer tape, as described above. This, however, is not a preferred embodiment, since it requires the bending of the tufts to all occur during the pressing of the laid-up combination and does not adhesively bind the tufts on the lower surface 48.

The most preferred method of producing the present improved shields involve a three-step process. In the first step, the insulation batt 40 is separately produced by the needling technique described above. The insulation batt 40 is then die cut into pieces of the correct configuration for a particular shield.

In a second separate step, the cut insulation pieces are placed, in a correctly spaced-apart position, on a tape having a pressure-sensitive adhesive on the upper side thereof. Simply placing, e.g. dropping the cut pieces of the insulation batt into the pressure-sensitive adhesive will hold the pieces in place during further processing. A heat activatable film of adhesive, e.g. heat activatable polyester adhesive, is placed over the cut pieces of insulating batt and the protective foil is placed over the film of adhesive. This assembly is then passed through the nip of two rolls with the roll next to the protective foil being heated sufficiently to heat the film of adhesive, causing it to melt, tackify and adhere the protective foil to the pieces and forming a laminate thereof.

In the third step, the so-produced laminate is die cut to produce the shields.

Figure 16:
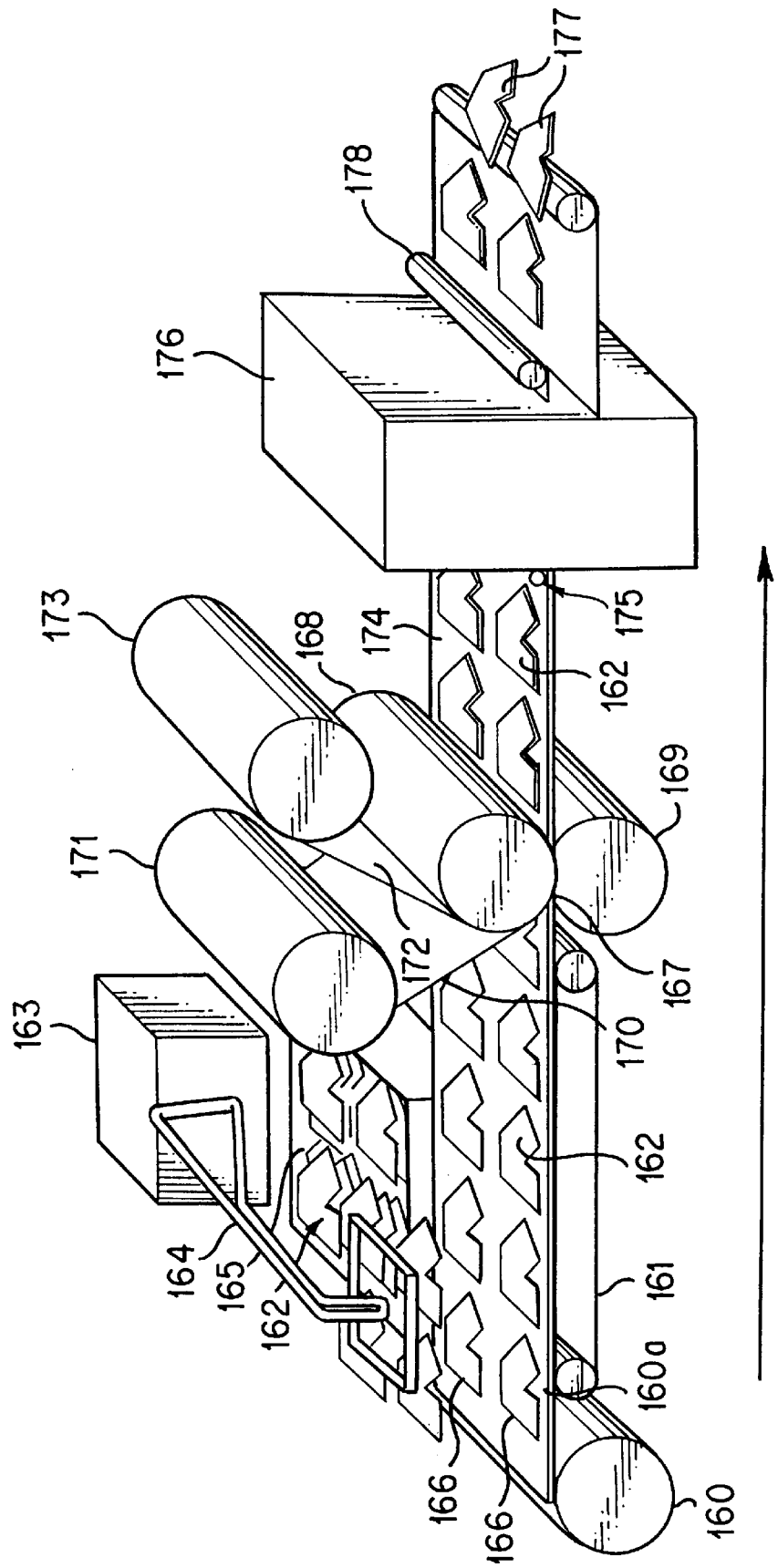
FIGS. 16 and 17 show preferred forms of the process for making the present improved shield.

FIG. 16 shows this preferred process in regard to steps two and three, since step one is fully discussed above. As can be seen from FIG. 16, a roll 160 of pressure-sensitive adhesive on a strippable foil, as described above, i.e. a tape 160*a* is unwound onto a support 161, and die cut pieces 162 of insulation batt (in the form of pre-cut blanks) are moved by conventional robotic "pick and place" positioner 163, with a placement arm 164, from a supply 165 thereof to selected positions 166. When the die cut pieces 162 are dropped onto the tape 160*a* (pressure-sensitive adhesive side up) by the placement arm 164, the height of the arm above the tape 160*a* is such that the fall of the die cut pieces 162 is sufficient for the die cut pieces 162 to be adhered to the pressure-sensitive adhesive on tape 160*a* and remain in the selected position. The tape 160*a* with die cut pieces 162 thereon is passed through the nip 167 of heated roll 168 and pressure roll 169 (or both may be heated). Heated roll 168 (preferably a metal roll) may have a decorative pattern embossed thereon and pressure roll 169 is preferably a resilient roll or a resilient surfaced roll such as a high temperature rubber roll or surfaced roll.

Also passing through nip 167 is a high temperature adhesive film 170, e.g. a polyester adhesive film, which is unwound from adhesive film supply roll 171 and a metal foil 172, e.g. aluminum foil, unwound from metal foil supply roll 173. Heated roll 168 and pressure roll 169 form a laminate 174 of all of the tape 160*a*, die cut pieces 162, adhesive film 170 and metal foil 172 by way of the heated roll 168 causing the adhesive film 170 to melt or tackify and adhere those components together as a laminate 174.

A conventional part sensor 175 senses the leading edge of a cut piece 162 in laminate 174 and at the proper time causes die cutter 176 to cut laminate 174 into complete shields 177 as described above. The scrap 178 of the laminate 174 is wound up for disposal.

Figure 17:
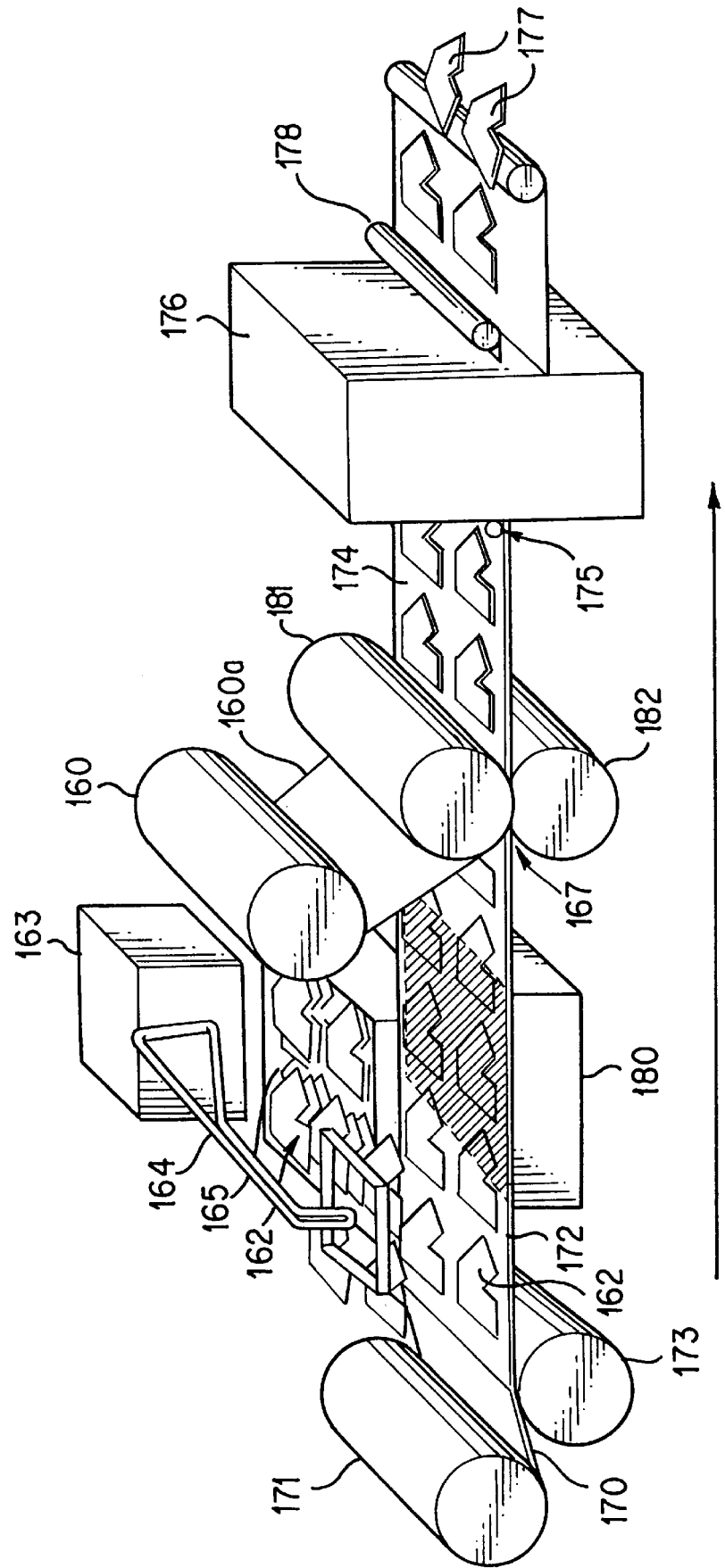

The above-described process is, quite obviously, amendable to a number of variations thereof, and FIG. 17 shows a particularly useful variation. In FIG. 17, like elements have the same reference numerals as in FIG. 16. As can be seen from FIG. 17, in that variation, the metal foil 172, unwound from supply roll 173, has placed thereon the adhesive film 170 which is unwound from supply roll 171. The cut pieces 162 are placed on the adhesive film 170 by the "pick and place" positioner 163 and that combination is passed over a hot bed zone 180 which melts or tackifies adhesive film 170. Then, the tape 160*a*, unwound from supply roll 160, is placed thereover. All of these then pass through nip 167 of resilient rolls 181 and 182, e.g. high temperature rubber rolls or high temperature surfaced rubber rolls, where laminate 174 is formed. The remainder of the process is the same as described in connection with FIG. 16.

The invention will now be illustrated by the following examples, where all percentages are by weight, unless indicated otherwise, as is also the case of the specification.

EXAMPLE

A first web of 3 denier, 3 inches staple length polyester fibers was carded onto a moving conveyor belt with the web having a weight of about 2 ounces per square yard. A preformed glass fiber batt (Owens Corning SR-26 range glass) 1 inch thick and 1 lb./cu. ft. density was unrolled onto the moving conveyor and placed on top of the carded web of polyester fibers. A second web of polyester fibers, which was the same as the first web, was carded onto the moving conveyor and on top to the glass fiber batt, so as to form a sandwich of the glass fiber batt between the two carded polyester fiber webs.

The sandwich was passed from the conveyor to a conventional double-acting needle loom (Shoou Shyng Model SDP250112-2) fitted with conventional needles (Groz Beckert 15-18-36-3, style F 333). The sandwich was needled in the double-acting loom with needle punches of approximately 800 needle punches per square inch, with needle penetrations such that the barbs of the needles extended beyond the opposite surface of the sandwich by about ⅛ to ⅕ inch, so as to place a tuft of polyester fibers on that opposite surface at about all needle punches.

The needle-punched sandwich was die cut to pieces configured to the shape of a desired shield to provide the fibrous batt of the shield. The die cut pieces were spaced apart laminated between an aluminum foil (zero temper, 1100 alloy, 0.01 inch thick) and a pressure-sensitive tape (Avery 8346—a PET 0.5 mil film with acrylic adhesive on both sides) using a heat activated polyester adhesive laminating film (Turex P-900) and a heated laminator (minimum laminating temperature 450° F.) having pressure exerting nip rubber rollers (about 40–60 psi nip pressure), as shown in FIG. 16.

The so-produced product was die cut, as shown in FIG. 16, to provide edge portions of the product which extended beyond the edges of the fibrous batt by one inch.

A pull-tab on the release paper was provided by arranging the cutting die to not cut through to the release paper on the pressure-sensitive tape at a small section.

Samples of shaped shields were tested by removing the release paper and pressing the shields from the aluminum foil side to configure the shields to various contours and permanently adhere the shields to those contours. At the same time, the edge portions were pressed to the contours to self-seal the shield to the contours.

A. Samples of a batt material which had been needled, but not laminated, as recited above, were prepared by cutting (stamping) approximately 10 inches by 2 inches samples and cutting the samples in a plane parallel to the sample surfaces and mid-point of the thickness of the sample to provide two separated cut sections of the sample, each having a cut length of about 1 inch. One of the cut sections was clamped in one jaw of an Instron machine and the other cut section was clamped in the other jaw of the Instron machine. The jaws were separated by the machine at a cross-head speed of about 10 feet per minute and the average internal bond of the samples was determined to be about 9 Newtons.

B. Samples of the product of this example (after lamination and cutting) were similarly tested. The average internal bond of the samples was determined to be about 31 Newtons.

C. As a comparison, samples of a needled batt according to U.S. Pat. No. 4,522,876 to Hiers (see FIG. 3), but not laminated as recited above were similarly tested. The internal bond of these samples was between 1.5 and 5 Newtons (average about 3 Newtons).

Thus, it can be seen that the samples of A, above, have a very improved internal bond by virtue of the needled tufts, as opposed to the needling of the Hiers patent (the samples of C, above), and a very high internal bond is achieved when the needled batt is laminated according to this example (the samples of B, above).

Further, this improved shield is self-sealing, as described above, when the edge portions are adhered to the object to be protected.

D. A sample of this example was placed in a flat steel pan and adhered to the bottom of that pan by pressing from the aluminum foil side to seal the shield and its one-half inch edge portions to the bottom of the pan. Gasoline was poured into the pan to submerge the adhered shield. After 2 hours 40 minutes of submergence, the gasoline was poured off. The adhered shield was examined for gasoline penetration through the edge portions, and it was determined that the maximum gasoline penetration of the edge portions was 1/16 inch. The shield was still firmly attached to the bottom of the pan. This is a test for such shields which are intended for protection of automobile gasoline tanks.

It will be appreciated that obvious modifications can be made to the specific embodiments disclosed above, and it is intended that those obvious modifications are embraced by the spirit and scope of the annexed claims. In the claims, the drawing reference numerals are for convenience only and are not limitations of the claims.

What is claimed is:

1. A flexible, adhesively attachable, self-sealing, thermal and acoustical insulating shield, comprising:

(1) a needled, flexible, fibrous batt (40) having an insulating layer (43) of insulating fibers (44) disposed between opposite binding layers (41, 42) of binding fibers (45) with binding fibers (45) of each binding layer (41, 42) being needledly disposed through the insulating layer (43) and an opposite binding layer (41, 42) to provide tufts (46) of binding fibers (45) protruding from the opposite binding layer (41, 42) so as to form a tufted upper surface (47) and a tufted lower surface (48) of the batt (40);

(2) a flexible adhesive (50), disposed and adhered substantially over the tufted upper surface (47) such that the tufts (46) on the tufted upper surface (47) are secured to that surface by the adhesive (50); and (3) a flexible, protective foil (51) adjacent to the tufted lower surface (48) of the batt (40), said protective foil (51) having edge portions (112) which extend beyond edges (113) of the fibrous batt (40) and said edge portions (112) having a flexible adhesive (114) disposed and adhered substantially over edge upper surfaces (115) of the edge portions (112); and wherein the shield may be flexed and pressed to configure and permanently attach the tufted upper surface (47) to an object (1) to be shielded and the edge portions (112) may be pressed to permanently attach the edge upper surfaces (115) of the edge portions (112) to the object (1) to be shielded so as to self-seal the edge portions (112) to the object (1).

2. The shield of claim 1, wherein the tufted lower surface (48) of the batt (40) has disposed and adhered substantially thereover a flexible adhesive (50) such that tufts (46) on the tufted lower surface (48) are secured to that surface and the flexible, protective foil (51) is permanently adhered by the adhesive (50) to the tufted lower surface (48) of the batt (40).

3. The shield of claim 2, wherein the adhesive (50) on the tufted upper surface (47) and the adhesive (114) on the edge upper surfaces (115) are a pressure-sensitive adhesive and a flexible, strippable foil (52) is releasably adhered by the pressure-sensitive adhesive (50, 114) to the tufted upper surface (47) of the batt (40) and the edge upper surfaces (115) such that by removal of the strippable foil (52) the pressure-sensitive adhesive (50, 114) on the tufted upper surface (47) and the edge upper surfaces (115) is exposed.

4. The shield of claim 1, wherein the batt has a thickness of between about 0.1 and 3 inches, the weight ratio of insulating layer to each binding layer is about 0.5 to 12.0:1, and the weight of each binding layer is substantially the same.

5. The shield of claim 1, wherein the insulating fibers are inorganic fibers.

6. The shield of claim 5, wherein the insulating fibers are glass fibers.

7. The shield of claim 1, wherein the binding fibers are organic fibers.

8. The shield of claim 7, wherein the organic fibers are polyester fibers, nylon fibers, olefin fibers and cellulose acetate fibers.

9. The shield of claim 2, wherein the needledly disposed binding fibers have a needling density of between about 500 and 10,000 needle punches per square inch of the batt and there are between about 500 and 10,000 tufts per square inch of the batt on the tufted upper surface (47) and the tufted lower surface (48).

10. The shield of claim 9, wherein there are between about 700 and 5,000 tufts per square inch on the tufted upper surface (47) and the tufted lower surface (48).

11. The shield of claim 2, wherein the adhesive (50, 114) is a pressure-sensitive adhesive containing an acrylate.

12. The shield of claim 11, wherein the acrylate is selected from the group consisting of methacrylate and ethyacrylate.

13. The shield of claim 1, wherein the protective foil has a thickness of between about 2 mils and 100 mils.

14. The shield of claim 13, wherein the thickness is between about 10 mils and 50 mils.

15. The shield of claim 2, wherein the protective foil is a metal foil or a plastic foil.

16. The shield of claim 15, wherein the protective foil is an aluminum foil or a polyester foil.

17. The shield of claim 3, wherein the strippable foil has a thickness of between about 1 mil and 50 mils.

18. The shield of claim 17, wherein the strippable foil has a release coating on a side thereof which contacts the pressure-sensitive adhesive.

19. The shield of claim 18, wherein the strippable foil is a metal foil, plastic foil or paper foil.

20. The shield of claim 19, wherein the strippable foil is a paper foil.

21. A method for producing a flexible, adhesively attachable, self-sealing, thermal and acoustical insulating shield, comprising:

(1) forming a flexible, fibrous batt (40) having an insulating layer (43) of insulating fibers (44) disposed between opposite binding layers (41, 42) of binding fibers (45);

(2) needling the batt (40) such that binding fibers (45) of each binding layer (41, 42) are needled through the insulating layer (43) and opposite binding layer (41, 42) to provide tufts (46) of binding fibers (45) protruding from the opposite binding layer (41, 42) so as to form a tufted upper surface (47) and a tufted lower surface (48) of the batt (40);

(3) applying and adhering a flexible, adhesive (50) over substantially the tufted upper surface (47) of the batt (40) such that the tufts (46) on the tufted upper (41) are secured to that surface (47) by the adhesive (50); and (4) applying a flexible, protective foil (51) to the tufted lower surface (48) of the batt (40), said protective foil (51) having edge portions (112) which extend beyond edges (113) of the fibrous batt (40) and said edge portions (112) having a flexible adhesive (114) disposed and adhered substantially over edge upper surfaces (115) of the edge portions (112); and wherein the shield may be flexed and pressed to configure and permanently attach the tufted upper surface (47) to an object (1) to be shielded and the edge portions (112) may be pressed to permanently attach the edge upper surfaces (115) of the edge portions (112) to the object (1) to be shielded so as to self-seal the edge portions (112) to the object (1).

22. The method of claim 21, wherein to the tufted lower surface (48) of the batt (40) a flexible adhesive (50) is applied and adhered substantially over that surface such that tufts (46) on the tufted lower surface (48) are secured to that surface and the flexible, protective foil (50) is permanently adhered by the adhesive (50) to the tufted lower surface (48) of the batt (40).

23. The method of claim 22, wherein the adhesive (50) on the tufted upper surface (47) and the adhesive (114) on the edge upper surfaces (115) are a pressure-sensitive adhesive and a flexible, strippable foil (52) is releasably adhered by the pressure-sensitive adhesive (50, 114) to the tufted upper surface (47) of the batt (40) and to the edge upper surfaces (115) such that by removal of the strippable foil (52) the pressure-sensitive adhesive (50, 114) on the tufted upper surface (47) and the edge upper surfaces (115) is exposed.

24. The method of claim 21, wherein the needled batt has a thickness of between about 0.1 and 3 inches, the weight ratio of insulating layer to each binding layer is about 0.5 to 12.0:1, and the weight of each binding layer is substantially the same.

25. The method of claim 21, wherein the insulating fibers are inorganic fibers.

26. The method of claim 25, wherein the insulating fibers are glass fibers.

27. The method of claim 21, wherein the binding fibers are organic fibers.

28. The method of claim 27, wherein the organic fibers are polyester fibers, nylon fibers, olefin fibers and cellulose acetate fibers.

29. The method of claim 21, wherein the needled binding fibers have a needling density of between about 500 and 10,000 needle punches per square inch of the batt and there are between about 500 and 10,000 tufts per square inch of the batt on the tufted upper surface (47) and the tufted lower surface (48).

30. The method of claim 29, wherein there are between about 700 and 5,000 tufts per square inch on the tufted upper surface (47) and the tufted lower surface (48).

31. The method of claim 22, wherein the adhesive is a pressure-sensitive adhesive containing an acrylate.

32. The method of claim 31, wherein the acrylate is selected from the group consisting of methacrylate and ethyacrylate.

33. The method of claim 21, wherein the protective foil has a thickness of between about 2 mils and 100 mils.

34. The method of claim 33, wherein the thickness is between about 10 mils and 50 mils.

35. The method of claim 21, wherein the protective foil is a metal foil or a plastic foil.

36. The method of claim 35, wherein the protective foil is an aluminum foil or a polyester foil.

37. The method of claim 22, wherein the strippable foil has a thickness of between about 1 mil and 50 mils.

38. The method of claim 37, wherein the strippable foil has a release coating on a side thereof which contacts the pressure-sensitive adhesive.

39. The method of claim 38, wherein the strippable foil is a metal foil, plastic foil or paper foil.

40. The method of claim 39, wherein the strippable foil is a paper foil.

41. A method of applying the shield of claim 1 to an object to be thermally and acoustically protected, comprising:

(1) exposing the adhesive (50, 114) on the tufted upper surface (47) and on the edge upper surfaces (115); and (2) pressing the batt (40) at the protective foil (51) to configure the shield to contours (90) of the object (91) to be shielded and causing the adhesive (50) on the tufted upper surface (47) to permanently adhere to the contours (90), and pressing the edge portions (112) against the object (91) to permanently seal the edge portions (112) to the object (91).

42. The method of claim 41, wherein a flexible, strippable foil (52) is releasably adhered by the adhesive (50, 114) to the tufted upper surface (47) of the batt (40) and to the edge upper surfaces (115) such that by removal of the strippable foil (52) the adhesive (50, 114) on the tufted upper surface (47) and edge upper surfaces (115) is exposed.

43. The method of claim 41, wherein the pressing at the protective foil (51) and the edge portions (112) is a manual pressing.

44. The method of claim 41, wherein, prior to step (1), the shield is subjected to a preforming step to conform the shield to general contours of the object.

* * * * *